United States Patent
Ohanian et al.

[11] Patent Number: 6,122,287
[45] Date of Patent: Sep. 19, 2000

[54] METHOD AND APPARATUS FOR DETECTING SWITCHED NETWORK PROTOCOLS

[75] Inventors: Russ Ohanian, West Roxbury, Mass.; Joachim Schubert, Dortmund; Achim Löbbert, Essen, both of Germany; Bradford R. Steinka, Franklin, Mass.

[73] Assignee: Microcom Systems, Inc., Norwood, Mass.

[21] Appl. No.: 08/599,183

[22] Filed: Feb. 9, 1996

[51] Int. Cl.[7] ................................. H04J 3/16; H04J 3/12
[52] U.S. Cl. ............................................. 370/465; 370/524
[58] Field of Search ........................... 375/222; 370/465, 370/466, 467, 469, 470, 471, 472, 475, 476, 276, 419, 421, 522, 524; 395/821, 836, 200.6, 200.61, 200.62, 200.63, 200.64, 8.31, 285; 379/210, 93.31–93.34, 93.08, 100.17

[56] References Cited

U.S. PATENT DOCUMENTS

| | | |
|---|---|---|
| 4,755,992 | 7/1988 | Albal . |
| 5,012,470 | 4/1991 | Shobu et al. . |
| 5,142,528 | 8/1992 | Kobayashi et al. ...................... 370/469 |
| 5,182,748 | 1/1993 | Sakata et al. . |
| 5,208,806 | 5/1993 | Hasegawa ................................ 370/60.1 |
| 5,274,700 | 12/1993 | Gechter et al. .......................... 379/210 |
| 5,289,468 | 2/1994 | Yoshida . |
| 5,311,590 | 5/1994 | Arnold et al. . |
| 5,323,392 | 6/1994 | Ishii et al. ............................... 370/466 |
| 5,341,377 | 8/1994 | Ohtani . |
| 5,420,867 | 5/1995 | Price et al. . |
| 5,425,026 | 6/1995 | Mori . |
| 5,440,558 | 8/1995 | Ban ........................................ 370/85.1 |
| 5,442,630 | 8/1995 | Gagliardi et al. . |
| 5,463,628 | 10/1995 | Sorenson ............................... 370/110.1 |
| 5,509,121 | 4/1996 | Nakata et al. ......................... 395/200.1 |
| 5,555,244 | 9/1996 | Gupta et al. ............................ 370/60.1 |
| 5,581,558 | 12/1996 | Horney, II et al. ...................... 370/401 |
| 5,606,599 | 2/1997 | O'Mahony et al. .................. 379/93.34 |
| 5,621,731 | 4/1997 | Dale et al. ................................. 370/79 |
| 5,640,394 | 6/1997 | Schrier et al. ........................... 370/389 |
| 5,671,251 | 9/1997 | Blackwell et al. ...................... 375/222 |
| 5,732,283 | 3/1998 | Rose et al. ............................. 395/836 |
| 5,751,796 | 5/1998 | Scott et al. ............................ 379/93.37 |

*Primary Examiner*—Chau Nguyen
*Assistant Examiner*—Chiho Andrew Lee
*Attorney, Agent, or Firm*—Mintz, Levin, Cohn, Ferris, Glovksy and Popeo, P.C.

[57] ABSTRACT

In order to transfer data via a switched network that provides a wide range of network services, the users must establish a circuit or network connection and establish a data link connection. The circuit or network connection provides the physical connection between the users and data link connection provides the protocols and procedures for the transfer of data. Because the network provides a wide range of services, the users, typically by prior agreement, designate a common data link protocol to facilitate the transfer of data. A data link connection will not be established if the users are not using the same data link protocol. A method and apparatus are disclosed which permit a local system to detect the data link protocol used by a remote system. The invention provides a method for detecting the data link protocol used by the remote system when the remote system initiates the data link setup and a method for detecting the data link protocol when the local system initiates the data link setup.

23 Claims, 4 Drawing Sheets

ISDN Protocol Architecture at the User-Network Interface

METHOD AND APPARATUS FOR DETECTING SWITCHED NETWORK PROTOCOLS

FIELD OF THE INVENTION

The present invention relates generally to switched network communications, and more particularly to a method and apparatus for automatically detecting the protocol used by a remote site during the establishment of a connection.

BACKGROUND OF THE INVENTION

The public switched telephone networks (PSTN) are analog networks designed primarily for the transmission of voice information. Through the use of modems these networks are capable of transmitting data, although even using the state of the art technology the data bandwidth is very limited. In order to meet the demand for increased bandwidth, a digital network known as integrated services digital network (ISDN) has been developed.

The PSTN is a system whereby calls (and thus circuits used to make the connection) are dedicated until either party terminates the call. This system is very inefficient because any unused bandwidth of a given call cannot be shared with other parties. Thus the PSTN may have thousands of circuits that are being underutilized and still not be able to have enough circuits to satisfy all the callers at a given time.

The ISDN is a switched digital network that enables the local telephone company to provide a range of services in order to meet the needs of their users and enable the telephone company to utilize their resources (circuits and switches) efficiently. A switched network is a network that provides a choice of services for establishing a circuit or network connection between parties. Those services typically include circuit switching services and packet switching services; however, other services such as asynchronous transfer mode (ATM) or frame relay technology are also available in some areas. The ISDN provides the available services to the user on an as needed basis as well as enables the user to increase or decrease bandwidth on demand.

The ISDN is intended to be a worldwide public telecommunications network to replace the existing PSTN and provide a wider range of services than the PSTN. In order to facilitate international standardization of ISDN systems, the Telecommunications Standardization Sector of the International Telecommunications Union (ITU-T) has promulgated the I Series Recommendations. The ITU-T I Series Recommendations in combination with other more general networking ITU-T recommendations define many aspects of the ISDN services, including the network interfaces and protocols.

ISDN service usually comprises one D-channel and one or more B-channels. The D-channel is used to setup the call with the ISDN service provider central office and to provide all the call control signals for each of the B-channels. The user contacts the telephone company via the D-channel to request different types of services provided by the network. Typically, the D-channel data rate can be 16K or 64K bits per second (bps). The Bearer Channel or B-channel is the basic user channel for the transfer of data and can provide a data rate of up to 64K bits per second (bps) per channel. It can be used to carry digital data, digitized voice, or a combination of the two. More than one B-channel can be combined to achieve higher data rates. Essentially, three kinds of circuit or network connections can be setup over a B-channel: circuit switched, packet switched and semipermanent (equivalent to a leased line). In addition to or instead of B-channels, H-channels, providing data rates greater than 64 Kbps, can be provided.

Basis ISDN access service, intended for residential and small office subscribers, is provided by what is called a Basic Rate Interface (BRI) which typically consists of two B-channels and one D-channel. A Primary Rate Interface (PRI), intended for commercial subscribers, typically consists of 23 or 30 B-channels and one D-channel. The PRI may also include H-channels instead of or in addition to B-channels.

The ITU-T recommendations define network interfaces and protocols in terms of the Open Systems Interconnect (OSI) reference model. The OSI reference model is an internationally recognized standard developed to provide a common basis for the coordination of standards development for systems interconnection. The OSI reference model separates the communications functions of a system into a hierarchical set of seven layers. Each layer performs a related subset of the functions required to communicate with another system. Each layer relies on the next lower layer to perform more primitive functions (and conceal the details of those functions) as well as provides services to the next higher layer. The seven layers are the physical layer, the data link layer, the network layer, the transport layer, the session layer, the presentation layer and the application layer. The physical layer, the data link layer and the network layer together provide what may be called network services. The ISDN interfaces and protocols are primarily concerned with these three layers.

The physical layer is concerned with the mechanical and electrical connections that couple the transmission medium (usually copper cable or optical fiber) that make up the circuit. The physical layer is also concerned with how an unstructured bit stream is transmitted across over the physical link. ITU-T Recommendations I.430 and I.431 define the physical layer for the ISDN Basic Rate Interface (BRI) and Primary Rate Interface (PRI) respectively. Examples of other physical layer specifications include Electronic Industries Association (EIA) RS-232 C, RS-422 and portions of ITU-T X.21

The data link layer provides for reliable transfer of data across the physical link and for the transmission of blocks of data (frames) with the necessary synchronization, error control and flow control. One common data link layer protocol is High-level Data-Link Control (HDLC). Other related data link layer protocols include Link Access Procedure Balanced (LAPB) for packet switched networks, X.75/SLP (Single Link Procedure) is similar to LAPB but provides additional features for interconnection of switched networks, Link Access Procedure for the D-channel (LAPD) used on the D-channel for data link control, ITU-T V.120 (similar to LAPD) used on the B-channel for circuit switched connections, Link Access Procedure for Frame-mode bearer services (LAPF) for networks providing frame relay services and Logical Link Control (LLC) for local area networks.

The network layer provides for the transfer of information between end systems across a network and relieves the upper layers of the burden of having to accommodate the underlying network protocols and technologies. The network layer is responsible for establishing, maintaining and terminating network connections. One example of a network layer standard is ITU-T X.25.

Circuit switched networks provide a dedicated circuit (on demand) between parties when either party places a call. The call is established when the network creates an end-to-end circuit connection between the parties. Once the call is established, the parties are free to select any data link protocol for the transmission of data. ITU-T Recommendation I.465/V. 120 (hereinafter referred to as V.120) defines one data link layer control protocol for circuit switched network services.

Packet switched networks provide a network of pathways between the parties and the system breaks the data transmitted between the parties into packets that are routed through the network. One of the most widely used protocols for packet switched network services is defined in ITU-T Recommendation X.25. ITU-T Recommendation X.25 defines one well known data link layer control protocol, Link Access Procedure—Balanced (LAPB).

In addition to V.120 and LAPB, other data link layer control protocols that can be used on switched networks include HDLC, transparent HDLC Synchronous Point-to-Point Protocol (Synchronous PPP), transparent HDLC Asynchronous Point-to-point Protocol (Asynchronous PPP), LAPF and LLC.

In order for two parties to transfer data, it is necessary for the parties to establish both a circuit or network connection between them and to establish a data link connection between them. As used herein, the circuit or network connection is intended to refer to the physical layer link between the parties equipment that affords the transfer of data. The data link connection includes the procedures and protocols necessary for the parties to transfer data via the circuit or network connection. A data link connection may be initiated by either party, typically by initiating a link setup procedure whereby the parties agree to begin the exchange of data according to a common protocol.

In order for a data link connection to be established it is necessary for both parties to utilize the same data link layer protocol. Thus, the parties must agree on the data link layer protocol prior to placing the call. This creates a problem for users of the types of networks that provide many services because there are many possible data link protocols. If the parties do not specify a data link protocol prior to placing the call and the parties' network interfacing equipment is configured for different data link protocols, a data link connection may not be established.

One solution to this problem is to assign separate telephone numbers for each protocol supported. Another solution is to utilize a sub-address to direct the call to a port configured for a specific protocol. The disadvantage with these solutions is that the caller still has to contact the remote party to determine which telephone number or sub-address is assigned to which protocol. In addition, some networks do not support sub-address functions.

OBJECTS OF THE INVENTION

Accordingly, it is an object of this invention to provide method of detecting the data link layer protocol used by a remote device.

It is another object of the invention to provide a method of detecting the data link layer protocol used by a remote device attempting to setup a data link connection with local device.

Another object of the invention is to provide a method of detecting the data link layer protocol used by a remote device, where the local device attempts to setup a data link connection with the remote device.

Yet another object of the invention is to provide a system which can detect the data link layer protocol used by a remote device.

Still another object of the present invention is to provide a system which can detect the data link layer protocol used by a remote device attempting to setup a data link connection with a local device.

And yet another object of the present invention is to provide a system which can detecting the data link layer protocol used by a remote device, where the local device attempts to setup a data link connection with a remote device.

And still another object of the present invention is to provide a system which can detect automatically the data link layer protocol used by a remote device in order to configure a local device to the appropriate data link layer protocol in order to establish the connection.

Other objects and advantages of the present invention will become readily apparent to those skilled in this art from the following detailed description wherein a preferred embodiment is shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not restrictive.

SUMMARY OF THE INVENTION

The invention is directed to a method of and system for detecting the data link layer protocol used by a remote system connected to a network that supports several data link layer protocols. In accordance with the present invention, a detection system is disclosed that can detect the protocol utilized by a remote system and permit a local system to establish a connection across the network utilizing the protocol detected. The detection system preferably forms part of a network interfacing device for coupling a unit of data terminal equipment to the network. The network interfacing device preferably is of the type having its own CPU with memory and is modified to include a system for automatically detecting the data link layer protocol used by a remote system during the establishment of a data link connection across the network.

The network interfacing device includes a detection system for detecting the data link layer protocol used by a remote system attempting to setup a data link connection, and a detection system for detecting the data link layer protocol used by a remote system, where the local system attempts to setup a data link connection with the remote system. The detection system automatically detects the protocol used by the remote system attempting to setup a data link connection with a local system by receiving one or more valid units of information and analyzing the information units to determine whether the information units include commands or responses that are characteristic of a specific data link protocol. For example, this may be accomplished by comparing specific fields in each information unit to the valid expected values for those fields according to the protocols to be detected. Alternatively, a protocol may be detected based upon other characteristics such as the information unit length or structure or a combination of various characteristics. Thus, a protocol can be detected when the fields of one or more valid information units match the expected values for that specific protocol. When a protocol is detected, the local system activates the appropriate protocol subsystem to permit the local system to establish a data link connection and communicate with the remote system across the network. If the fields do not match, the same or different fields of the one or more valid information units are automatically compared, preferably in a predefined sequence, with the expected values for different protocols until a match is obtained or no protocol is detected. If no protocol is detected, a default protocol can be assumed or it can be assumed that a data link connection cannot be established and the call may be terminated.

In one embodiment, the detection system compares the first valid data unit to the link setup commands of the various protocols supported by the local system. The protocol is detected according the link setup command received from the remote system. In an alternative embodiment, a subset of protocols that share a common (or similar) command or response can be detected by first detecting that one valid information unit includes the common command or response and then analyzing a second valid information unit received to determine if it is a command or response characteristic of one specific protocol. As stated above, this can be accomplished by detecting various features characteristic of each of the subset of protocols to detected. It is further contemplated that additional frames may be compared to additional characteristic features to further detect the difference between two or more similar protocols. Alternatively, additional frames may be compared to additional characteristic features to further verify the protocol detected.

In the case where the local system attempts to setup a data link connection, the local system automatically detects the protocol used by a remote system by transmitting a link setup command for a given protocol to the remote system and waiting for an acknowledgement. If the acknowledgement is received, the protocol is detected and the local system activates the protocol subsystem necessary to establish a data link connection communicate with the remote system. If the acknowledgement is not received within a specific timeout period, the link setup commands for other protocols are transmitted, preferably in a predefined sequence, until an acknowledgement is received or no protocol is detected. If no protocol is detected, a default protocol can be answered, or it can be assumed a data link connection cannot be established and the call can be terminated.

In addition, the local system can send one or more additional commands to the remote system and utilize the response (such as an acknowledgement or reply) to further verify the protocol being used by the remote system. Such a system may be used to detect a subset of protocols that utilize a common or similar link setup commands.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE DRAWINGS

The present invention is directed to an automatic method and system used by a local system for detecting the data link protocol used by a remote system in order to establish a data link connection across a network for the transfer of information such as digital data or digitized voice data. The network is of the type that permits the use of several different protocols that are not necessarily compatible and where users are free to select a protocol that meets their specific needs. As used herein, the term "network" is intended to include any means that permits the transfer of information between two points, including traditional dedicated or leased lines, circuit switched networks such as provided by PSTNs and ISDNs, and virtual connections such as those provided by networks offering packet switched, frame relay or cell relay services.

By way of example, a detection system is described herein for use with Integrated Services Digital Networks (ISDN). The ISDN is a switched network that permits the user to specify the type of connection to be established and thus permits the use of any one of many data link protocols. The physical interface (corresponding to the physical layer of the OSI Model) is dictated by the ISDN service provider (typically the telephone company). The most common physical interfaces are the Basic Rate Interface (BRI) and the Primary Rate Interface (PRI) as defined in the ITU-T I.430 and I.431 Recommendations.

Figure 1:
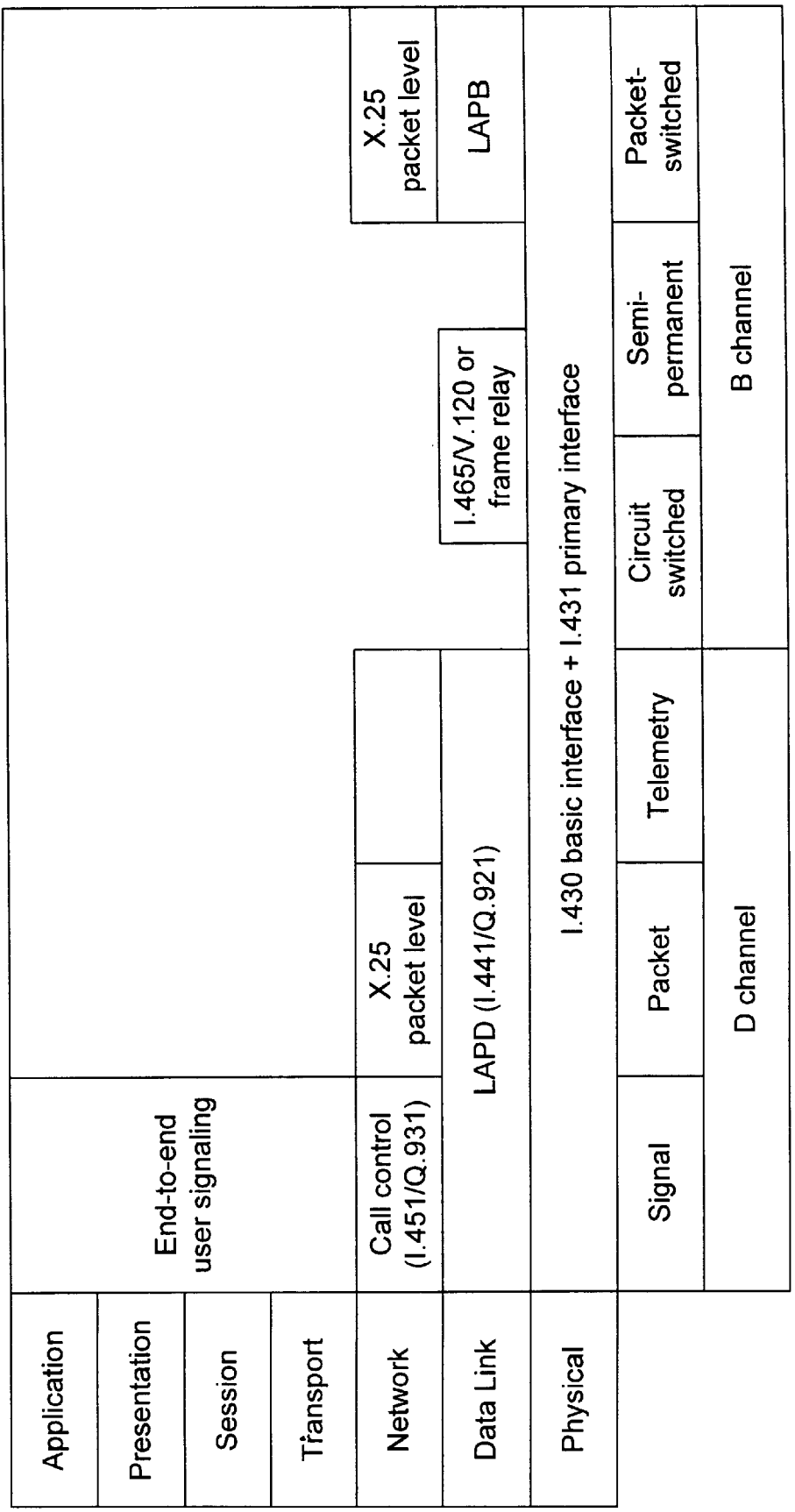
FIG. 1 is a diagram showing the ISDN Protocol Architecture and the various ITU-T standards that define the various layer functions.

FIG. 1 is a diagram of the ISDN protocol architecture illustrating the relationship between the various ITU-T recommendations and how they are classified according to the OSI model. As one of ordinary skill in the art will appreciate, the ITU-T Specifications are merely recommendations intended to foster public standardization and facilitate worldwide open interconnection, and accordingly compliance with these recommendations is encouraged but not required. Users are free to choose among various public protocols or to implement their own proprietary protocol. In either case, each party participating in a call must utilize the same protocol in order to establish a data link connection and reliably transfer data across the network.

Figure 2:
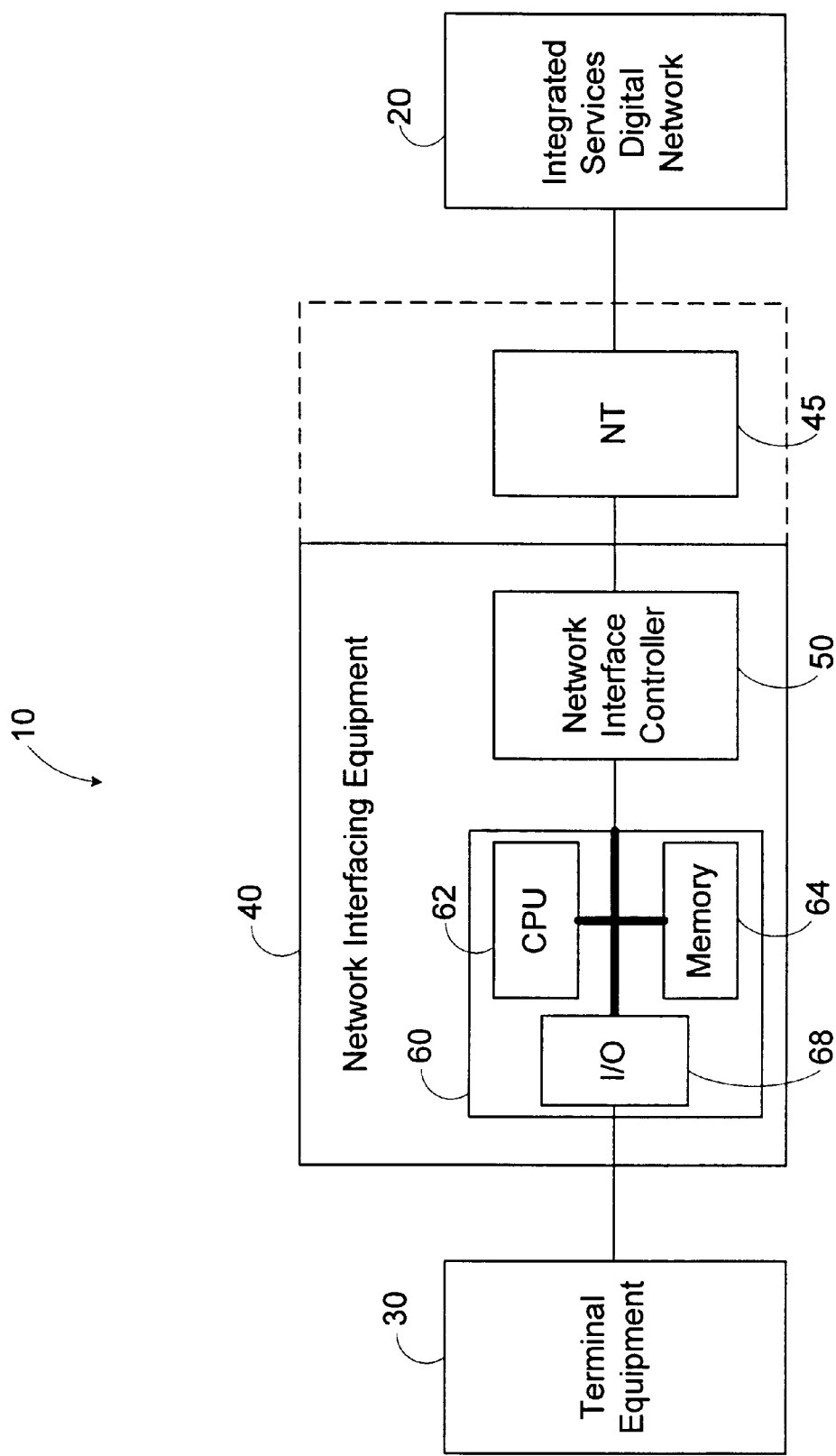
FIG. 2 is a block diagram of a detection system constructed in accordance with the present invention.

FIG. 2 is a block diagram of a detection system 10 for connecting a piece of terminal equipment 30 to an ISDN 20, detection system 10 includes a piece of network interfacing equipment 40 in accordance with the present invention. ISDN service requires a network terminating device 45, which can be provided as a separate entity or integrated into the network interfacing equipment 40 as shown in FIG. 2. The network terminating device 45 performs a physical layer conversion from the ISDN provider format called the U interface to the ITU-T I.430/I.431 Recommendation format called the S/T interface. The network interfacing equipment 40 may also include the ability to convert, at the physical layer, the S/T interface to a non-ISDN interface such as RS-232C for connection to conventional non-ISDN data terminal equipment. Such a device is more commonly known as a terminal adapter.

In the preferred embodiment, the invention forms part of an internal ISDN terminal adapter which can optionally include a network terminating device 45. The device takes the form of an IBM PC compatible adapter card. The invention may also take the form of an external terminal adapter for use with other types of computers and terminal equipment. In addition, one of ordinary skill in the art will recognize that the invention can be integrated as part of a network terminating device. As such, the network terminating device 45 would provide an output port for each of the protocols supported or means to communicate to the terminal equipment 30 the protocol detected. Alternatively, the invention could be embodied in a piece of terminal equipment, with or without a network terminating device for direct connection to a switched network such as ISDN.

Preferably, the network interfacing equipment 40 includes a microprocessor based system controller 60 including a central processing unit (CPU) 62, associated memory systems 64 for storage, an interconnecting bus system 66 and an input-output system 68 for interfacing with other devices such as terminal equipment 30. The network interfacing equipment 40 also includes a network interface controller 50 for receiving information from the network terminating device 45 and separating the information into frames, and for receiving frames of information from controller 60 and processing that information for transmission through the network termination device 45 over an ISDN to a remote site. In accordance with the invention when receiving information from an ISDN, the network interface controller 50 sends each frame of information to the system controller 60 to determine the data link layer protocol associated with the received information. The system controller 60 can determine the data link layer protocol by comparing various fields of the first valid frame received from the network 20 with values that are characteristic of each specific protocol supported. The appropriate field values characteristic of each protocol supported by the network interfacing equipment 40 can be stored in memory 64. If a specific protocol is detected, the system controller 60 loads the software modules necessary to implement that protocol and establish a data link connection to communicate with remote system across the network 20. The appropriate fields of the first valid frame can be compared to corresponding values for each supported protocol in a predetermined sequence until a match occurs, although it should be appreciated that other time sequencing and comparing techniques can be used, for example, comparing the received values to the corresponding characteristic values of all the supported protocols at the same time. If no protocol is detected, a default protocol can be assumed, or a connection is not established and the call may be terminated.

In a preferred embodiment, one protocol to be detected is of the type used by systems connected to an ISDN for communication on a B-channel known as a B-channel protocol. In many instances, users of ISDN B-channels are capable of utilizing any one of several data link layer protocols for the transfer of data and unless the protocol is agreed upon prior to placing the call, a data link connection will not be established. Examples of those protocols include LAPB, X.75/SLP, V.120, LAPP and Synchronous PPP. As used herein, references to specific protocols such as LAPB or V.120 are intended to include all equivalent implementations of that protocol, including, for example, the similar LAPB implementations defined in ITU-T X.25 and X.75 and the similar LAPD implementations in ITU-T Q.921 and V.120. In the preferred embodiment, the network interface controller 50 is an HDLC controller which separates the incoming data into valid HDLC frames which are transferred to the system controller 60. In the case where a remote system attempts to setup a data link connection, the system controller 60 checks the first valid frame for each of the protocols supported. For example, in the preferred embodiment, the LAPB protocol is detected if the frame contains a SABM command or if the first frame byte is the LAPB link address B (0x01) and second frame byte is a valid LAPB control field. The V.120 protocol is detected if the frame contains a SABME command or if the first two frame bytes are equal to the V.120 default Logical Link Identifier (LLI) (0x0801) and the third frame byte is a valid V.120 control field. The transparent HDLC Synchronous PPP is detected if the first two frame bytes are equal to the PPP address header (0xFF03). If none of the above protocols are detected, the detection system will assume the a transparent HDLC protocol is being used.

Alternatively, a command that is common to two or more protocols can be detected and then a second received information unit can be analyzed to determine if it contains characteristics of a supported protocol. For example, both LAPB and V.120 utilize an XID command and responses to exchange information regarding connection management. In accordance with the invention, an XID command or response can be detected and then the appropriate protocol, either LAPB or V.120, will be detected upon receipt of a SABM or SABME command, respectively.

In the case where the local system (including an architecture similar to or the same as that shown in FIG. 2) attempts to setup a data link connection, the system controller 60 of the local system will attempt to initialize the data link using by an acknowledged link setup procedure. As part of this procedure, the system controller 60 sends a link set mode command to the remote system (also including an architecture similar to or the same as that shown in FIG. 2) requesting the setup of a data link using a specific mode of data transfer. For example, HDLC supports several modes including Normal Response Mode (for multi-drop line configurations), Asynchronous Balanced Mode (ABM) for point to point connections and Asynchronous Response Mode (ARM). Thus, the system controller 60 of the local system sends a Set mode command such as Set Asynchronous Balanced Mode (SABM) and waits for a remote system acknowledgement. If the acknowledgement is received, the system controller 60 loads the software modules necessary to implement the detected protocol (LAPB) and establish a data link connection to communicate with a remote system across the network 20. If an acknowledgement is not received before a specified timeout period expires, the detection system may repeat the set mode command for specified number of tries. If the remote system doesn't acknowledge the set mode command, the set mode command of a different protocol is sent. The system controller 60 will repeat this process for each of the supported protocols until a connection is established, or all the supported protocols have been rejected. If no connection can be established a failure is reported to the next higher (network) layer.

Alternatively, the system 10 can send one or more commands that are common or generic to a subset of protocols supported and wait for a response. The response can be analyzed to determine if it includes information characteristic of a specific protocol to be detected. In this embodiment, several commands and responses may be exchanged and one or more of the several responses or portions thereof can be evaluated in order to determine the protocol used by the remote system.

In the preferred embodiment, the system controller 60, sends a SABM command to detect LAPB and Set Asynchronous Balanced Mode Extended (SABME) to detect V.120.

One of ordinary skill in the art will appreciate that once a B-channel circuit or network connection is established between the parties participating in a call, either party may request initialization of the data link connection, thus the calling party need not be the party requesting initialization. Therefore, the called party of the remote location may request initialization. In either event, the invention is not dependent upon whether the system has initiated the call or is receiving a call.

Figure 3:
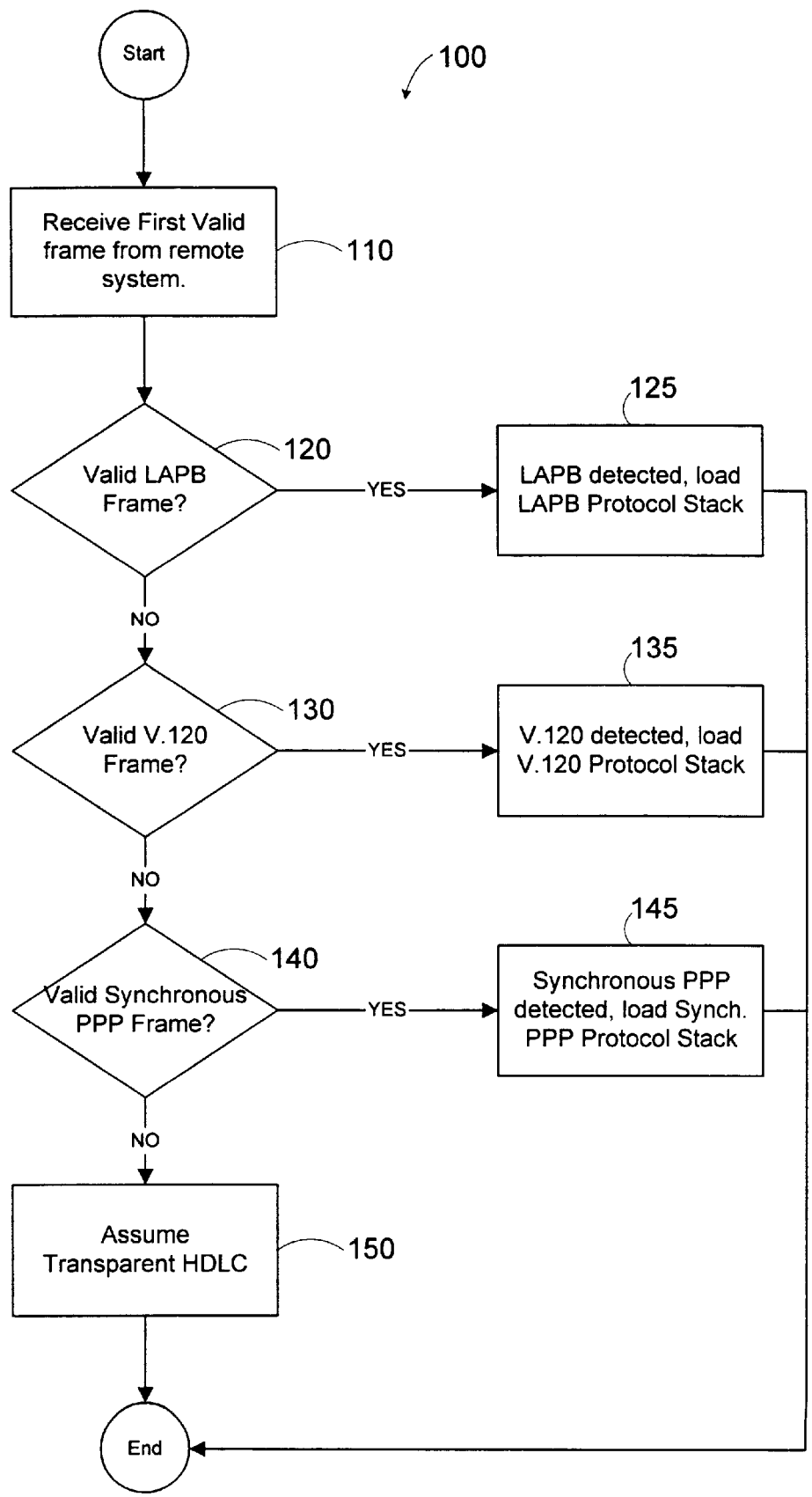
FIG. 3 is a flow chart illustrating the method of automatically detecting the protocol used by a remote caller of an incoming call in accordance with the present invention.

FIG. 3 is a flow chart illustrating the preferred process 100 of detecting the B-channel protocol in the case where a remote system is attempting to setup a data link connection in accordance with the present invention. In this situation the remote system is configured to utilize a predefined data link protocol and the local system is not configured for a specific data link protocol and will attempt to determine that protocol based the frames received.

The process 100 begins at step 110 when the local system receives the first valid frame from the remote system. One of ordinary skill in the art will appreciate that the protocol defines certain types of frames for specific functions such as information frames, supervisory frames and unnumbered frames. Thus, it is possible for the detection system to receive frames that are valid in the sense that they adhere to the format defined by the protocol specification, but are not valid because they are inappropriate at the time the frames are received or for the procedure defined by the protocol specification. These invalid frames can be ignored.

Optionally, the process can begin by receiving XID commands and the XID frame can be evaluated to determine whether it is from a system using the LAPB or a V.120 protocol. The system will respond to the XID command with the appropriate XID response for the protocol detected and wait to receive the next valid frame. The system would then utilize that second frame at step 120 verify that the appropriate protocol was selected.

At step 120, the detection system checks the frame to determine whether it is a valid LAPB frame. In the preferred embodiment, this is accomplished by verifying that the first byte in the frame (the address field) is equal to the LAPB link address B (0x01) and that the second byte in the frame (the control field) is a valid LAPB control field. If the LAPB protocol is detected, the detection system would enable the appropriate subsystem to implement the LAPB protocol, step 125, and begin the transfer of data. In the preferred embodiment, this is accomplished by executing a finite state machine that implements the LAPB protocol. Alternatively, an appropriate protocol stack implementing the LAPB protocol could be loaded.

If the LAPB protocol is not detected, the detection system checks the frame to determine whether it is a valid V.120 (LAPD) frame in step 130. In the preferred embodiment, this is accomplished by verifying that the first two bytes in the frame (the address field) are equal to the default LLI (0x0801) and the third byte in the frame is a valid V.120 control field. If the V.120 protocol is detected, the detection system would enable the appropriate subsystem to implement the V.120 protocol step 135, and begin the transfer of data. In the preferred embodiment, this is accomplished by executing a finite state machine that implements the V.120 protocol or alternatively, loading the appropriate V.120 protocol stack.

If the V.120 protocol is not detected, the detection system checks the frame to determine whether it is a valid Transparent HDLC Synchronous PPP frame at step 140. In the preferred embodiment, this is accomplished by verifying that the first two bytes in the frame (the PPP address header) are equal to (0xFF03). If the Synchronous PPP is detected, the detection system would enable the appropriate subsystem to implement the Synchronous PPP at step 145, and begin the transfer of data. In the preferred embodiment, this is accomplished by executing a finite state machine that implements the Transparent HDLC Synchronous PPP protocol or loading the appropriate Synchronous PPP protocol stack. If the Transparent HDLC Synchronous PPP protocol is not detected, that detection system assumes that a transparent HDLC protocol is being used.

Figure 4:
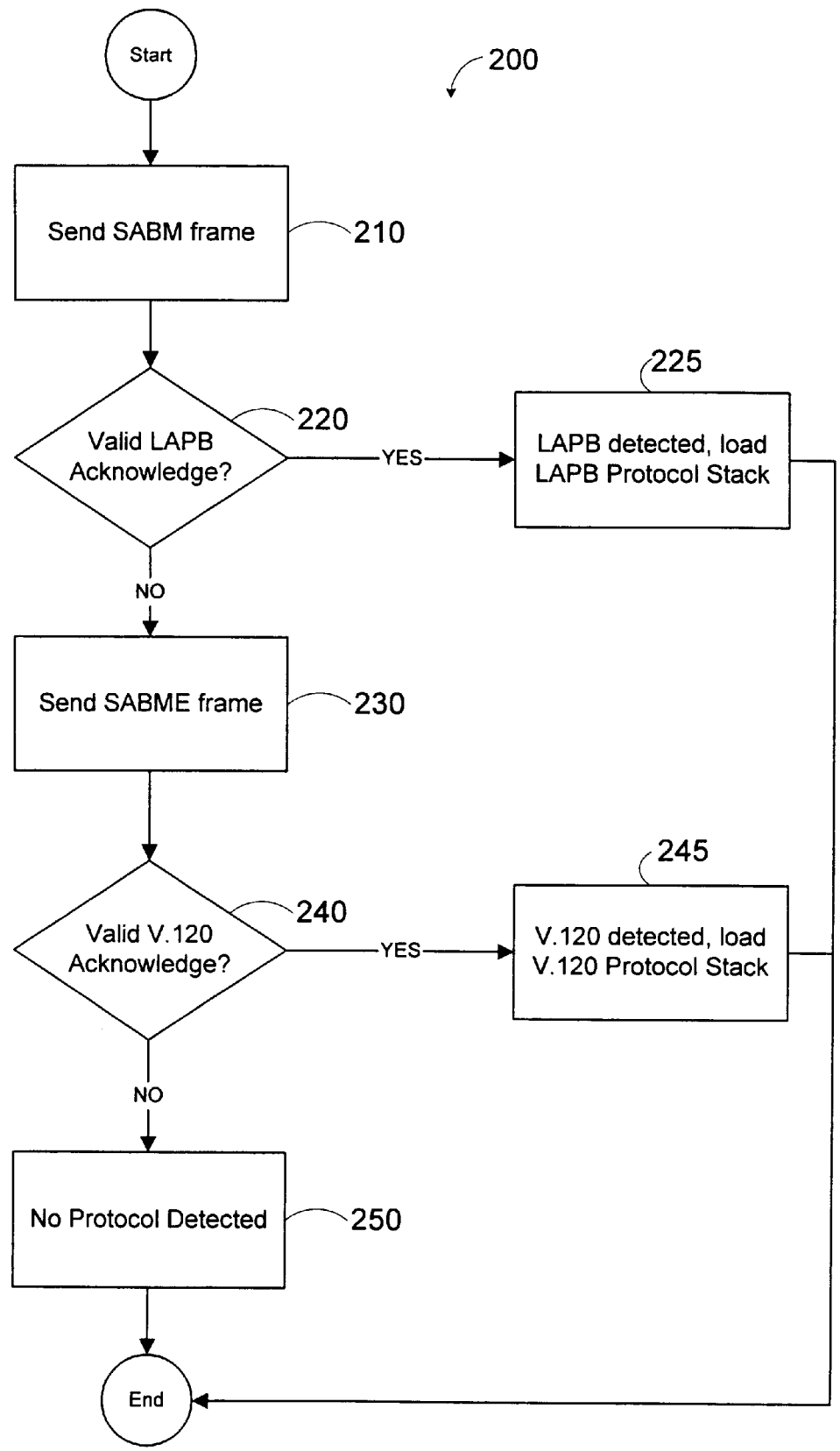
FIG. 4 is a flow chart illustrating the method of automatically detecting the protocol used by a remote caller for an outgoing call in accordance with the present invention.

FIG. 4 is a flow chart illustrating the process 200 of detecting the B-channel protocol in the case wherein the local system attempts to initialize a data link connection with a remote system in accordance with the present invention. In this situation the remote system is configured to utilize a predefined data link protocol and the local system is not configured for a specific data link protocol and will attempt to determine that protocol using an acknowledged link setup procedure. An acknowledged link setup procedure requires the remote system to respond to a link setup request packet with an acknowledgement packet.

The process 200 begins at step 210 when the local system attempts to initialize the data link by sending a set mode command to establish a LAPB connection. The local system then waits for a predefined timeout period for an acknowledge response at step 220. If no acknowledge is received within the timeout period, the detection system can repeat the process a predefined number of times and then abort the attempt to establish a LAPB connection. In the preferred embodiment, the local system sends a Set Asynchronous Balanced Mode (SABM) command. The detection system will wait 1 second for an acknowledge before timing out. The detection system will repeat the process 3 times before aborting the attempt at a LAPB connection. If an acknowledge is received, the detection system enables the appropriate subsystem to implement the LAPB protocol at step 225, and begin the transfer of data. In the preferred embodiment, this is accomplished by executing a finite state machine that implements the LAPB protocol or by loading a LAPB protocol stack.

If a LAPB connection cannot be established, the local system attempts to initialize the data link by sending a set mode command to establish a V.120 (LAPD) connection at step 230. The local system then waits for a predefined timeout period for an acknowledge at step 240. If no acknowledge is received within the timeout period, the detection system can repeat the process a predefined number of times and then aborts the attempt to establish a V.120 connection. In the preferred embodiment, the local system sends a Set Asynchronous Balanced Mode Extended (SABME) command. The detection system will wait 1 second for an acknowledge before timing out. The detection system will repeat the process 3 times before aborting the attempt at a V.120 connection. If an acknowledgement is received, the detection system enables the appropriate subsystem to implement the V.120 protocol at step 245, and begin the transfer of data. In the preferred embodiment, this is accomplished by executing a finite state machine that implements the V.120 protocol or by loading a V.120 protocol stack. If a V.120 connection cannot be established, the detection system will abort the attempt to establish a link.

In the preferred embodiment, the order in which the detection system checks for each protocol, as indicated in each of FIGS. 3 and 4 is not of critical importance to the invention. In addition to the protocols disclosed above, other protocols may be included. The order in which the detection system checks for each protocol may become important in environments where the timeout period for establishing a data link connection is short for a particular protocol, in which case that protocol should be detected first.

The order in which the detection system checks for each protocol is significant where both systems are utilizing the invention to detect a protocol. In this situation, any of the subset of protocols supported by both systems may be used and thus the first protocol checked that is supported by both systems will be used. Thus, the protocols that are preferred should be detected first.

In the foregoing description, the invention has been described as being incorporated as part of an end user system (local system) connected to a network for transmitting information to a remote system. One of ordinary skill in the art will appreciate that the invention may be incorporated in a network system or as part of the network in order to detect the protocol used by the network subscriber in order to establish a data link layer connection or to connect the subscriber to the appropriate network service. Alternatively, the invention may be incorporated in a system used to link or bridge two or more networks.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A network interfacing apparatus for interfacing at least one unit of terminal equipment to a switched network having at least one channel for receiving information including data from a remote site in accordance with either one of at least two distinct and predefined protocols, wherein each of said predefined protocols is identified by at least one predefined characteristic data value uniquely positioned within a predetermined sequence of values within a unit of information, said apparatus comprising:

receiving means for receiving at least one unit of information from said channel;

at least two protocol system means, one for each of said predefined protocols, for enabling said apparatus to communicate over said channel with said remote site according to a select one of said predefined protocols;

comparing means for respectively comparing at least one characteristic data value of said at least one unit of information received by said receiving means with at least one predefined characteristic data value used to identify said predefined protocols so as to identify the predefined protocol of the unit of information received by said receiving means; and means for selecting and enabling the appropriate one of said protocol system means in response to a match between the at least one characteristic data value of said at least one unit of information and the at least one predefined characteristic data value used to identify said predefined protocols, so as to permit said apparatus to communicate over said channel with the remote site according to the selected one of said predefined protocols.

2. A network interfacing apparatus according to claim 1, further comprising at least a third protocol system means for enabling said apparatus to communicate with said remote site according to a third protocol of said predefined of protocols.

3. A network interfacing apparatus according to claim 1, further comprising:

at least a third protocol system means for enabling said apparatus to communicate over said channel with said remote site according to a third protocol of said predefined of protocols; means for selecting and enabling the third protocol system means in response to a match between the at least one characteristic data value of said at least one unit of information and the at least one predefined characteristic data value used to identify said predefined protocols, so as to permit said apparatus to communicate over said channel with the remote site according to the selected one of said predefined protocols.

4. A network apparatus according to claim 1, wherein each of said predefined protocols is a data link protocol for the transfer of data across a switched network.

5. A network apparatus according to claim 1, wherein each of said predefined protocols is a data link protocol for the transfer of data across an ISDN network.

6. A network apparatus according to claim 1, wherein said at least one characteristic data value is defined within at least one data field in said at least one unit of information; and wherein said comparing means includes means for respectively comparing the data values within the at least one data field within at least one unit of information received by said receiving means with at least one of the corresponding predefined characteristic data values used to identify said predefined protocols.

7. A network apparatus according to claim 1, further comprising at least a third protocol system means for enabling said apparatus to communicate over said channel with said remote site according to a third protocol of said predefined of protocols; and a default protocol selection and enabling means for selecting and enabling the third protocol system means when said comparing means is unable to match any of the at least one characteristic data values of said at least one unit of information received by said receiving means with the at least one predefined characteristic data values used to identify said predefined protocols.

8. A method of detecting any one of a selected number of predefined communication protocols, each of said protocols being used to communicate information over a switched network having at least one channel for transmitting information and being identified by at least one characteristic data value within a predetermined sequence of values within a unit of information, said method comprising the steps of:

receiving at least one unit of information from said channel;

comparing at least one characteristic data value of said at least one unit of information received with at least one predefined characteristic data value used to identify said predefined protocols so as to identify the predefined protocol identified in the unit of information received from said channel; and selecting and enabling a protocol system means for transmitting information over said channel in accordance with a particular protocol in response to a match between the at least one characteristic data value of said at least one unit of information and the at least one predefined characteristic value used to identify each of said predefined protocols, so as to permit communication over said channel with the remote site according to the selected one of said predefined protocols.

9. The method according to claim 8, wherein the step of selecting and enabling includes the step of selecting and enabling a default protocol system means for transmitting information over said channel in accordance with the default one of said protocols when the at least one characteristic data values of said at least one unit of information fails to match, during said step of comparing, with the any of the at least one predefined characteristic data values used to identify said predefined protocols.

10. The method according to claim 8, wherein each of said predefined communication protocol is a data link layer protocol.

11. A network interfacing apparatus for interfacing at least one unit of terminal equipment to a switched network having at least one channel for transferring information including data to and from a remote system in accordance with any one of at least two predefined protocols, said apparatus comprising:

communication means for transmitting and receiving units of information via said channel;

at least two protocol system means, one for each of said predefined protocols, for enabling said apparatus to communicate via said channel with said remote system according to any one of said predefined protocols;

controller means for controlling said communication means, said controller means including means for selecting a first protocol system means to attempt to establish a data link connection between said apparatus and said remote system according to said first protocol, and means for selecting and enabling said first protocol system means if said data link connection is established and means for selecting and establishing said second protocol means if said data link connection according to said first protocol cannot be established.

12. A network interfacing apparatus for interfacing at least one unit of terminal equipment to a switched network having at least one channel for transferring information including data to and from a remote system in accordance with one of a plurality of predefined protocols, said apparatus comprising:

communication means for transmitting and receiving units of information via said channel, at least a first protocol system means for enabling said apparatus to communicate via said channel with said remote system according to a first protocol of said predefined protocols;

at least a second protocol system means for enabling said apparatus to communicate via said channel with said remote system according to a second protocol of said predefined protocols;

controller means for controlling said communication means, said controller means including means for selecting said first protocol system means to attempt to establish a data link connection via said channel between said apparatus and said remote system according to said first protocol, and means for selecting and enabling said first protocol system means to enable said apparatus to communicate via said channel with said remote system if said data link connection is established; and means for selecting said second protocol means if said data link connection according to said first protocol cannot be established to attempt to establish a data link connection between said apparatus and said remote system according to said second protocol, means for waiting for a predefined time period for said data link connection according to said second protocol to be established and means for selecting and enabling said second protocol system means to enable said apparatus to communicate with said remote system if said data link connection is established.

13. A method of detecting a communication protocol of the type used to communicate with a remote system over a switched network having at least one channel for receiving information, said method comprising the steps of:

transmitting over said channel a data link setup command according to a first communication protocol to said remote system;

waiting for a predetermined time for said remote system to acknowledge said data link setup command; and selecting and enabling a first protocol system means for providing communications over said channel according to said first communication protocol if said remote system acknowledges said data link setup command within said predefined time and selecting and enabling a second protocol system means for providing communications over said channel according to said second communication protocol if said remote system does not acknowledge said data link setup command within said predefined time.

14. A method of detecting a communication protocol of the type used to communicate with a remote system over a switched network having at least one channel for receiving information, said method comprising the steps of:

transmitting over said channel a data link setup command according to a first communication protocol to said remote system;

waiting for a predetermined time for said remote system to acknowledge said data link setup command;

selecting and enabling a first protocol system means for providing communications over said channel according to said first communication protocol if said remote system acknowledges said data link setup command within said predefined time; and if said remote system does not acknowledge said data link setup command within said predefined time;

transmitting over said channel a second data link setup command according to a second communication protocol to said remote system;

waiting for a second predetermined time for said remote system to acknowledge said second data link setup command;

selecting and enabling a second protocol system means for providing communications over said channel according to said second communication protocol if said remote system acknowledges said second data link setup command within said second predefined time.

15. A network interfacing apparatus for interfacing at least one unit of terminal equipment to a switched network having at least one channel for receiving information including data from a remote site in accordance with either one of at least two distinct and predefined protocols, wherein each of said predefined protocols is identified by at least one predefined characteristic data value uniquely positioned within a predetermined sequence of values within a unit of information, said apparatus comprising:

a receiver adapted for receiving at least one unit of information from said channel;

at least two protocol system, one for each of said predefined protocols, adapted for enabling said apparatus to communicate over said channel with said remote site according to a select one of said predefined protocols;

a comparing element adapted for respectively comparing at least one characteristic data value of said at least one unit of information received by said receiver with at least one predefined characteristic data value used to identify said predefined protocols so as to identify the predefined protocol of the unit of information received by said receiver; and a protocol selector adapted for selecting and enabling the appropriate one of said protocol systems in response to a match between the at least one characteristic data value of said at least one unit of information and the at least one predefined characteristic data value used to identify said protocol, so as to permit said apparatus to communicate over said channel with the remote site according to the selected one of said predefined protocols.

16. A network interfacing apparatus according to claim 15, further comprising
at least a third protocol system adapted for enabling said apparatus to communicate over said channel with said remote site according to a third protocol of said predefined of protocols.

17. A network interfacing apparatus according to claim 15, further comprising:
at least a third protocol system adapted for enabling said apparatus to communicate over said channel with said remote site according to a third protocol of said predefined of protocols; and wherein said protocol selector is adapted for selecting and enabling the third protocol system in response to a match between the at least one characteristic data value of said at least one unit of information and the at least one predefined characteristic data value used to identify said predefined protocol, so as to permit said apparatus to communicate over said channel with the remote site according to the selected one of said predefined protocols.

18. A network apparatus according to claim 15, wherein each of said predefined protocols is a data link protocol for the transfer of data across a switched network.

19. A network apparatus according to claim 15, wherein each of said predefined protocols is a data link protocol for the transfer of data across an ISDN network.

20. A network apparatus according to claim 15, wherein said at least one characteristic data value includes at least one data field value in said at least one unit of information and
wherein said comparing element is adapted for comparing said data field value with a predefined corresponding value appropriate for at least one of said predefined protocols.

21. A network apparatus according to claim 15, further comprising
at least a third protocol system adapted for enabling said apparatus to communicate over said channel with said remote site according to a third protocol of said predefined of protocols; and
a default protocol selector adapted for selecting and enabling the third protocol system corresponding to the one of said predefined protocols when said comparing element is unable to match any of the at least one data value of said at least one unit of information with at least one predefined characteristic data value used to identify said predefined protocols so as to identify the predefined protocol of the unit of information received by the receiver.

22. A network interfacing apparatus for interfacing at least one unit of terminal equipment to a switched network having at least one channel for transferring information including data to and from a remote system in accordance with any one of at least two predefined protocols, said apparatus comprising:
a network interface adapted for transmitting and receiving units of information via said channel;
at least two protocol systems, one for each of said predefined protocols, adapted for enabling said apparatus to communicate via said channel with said remote system according to any one of said predefined protocols; and
a system controller adapted for controlling said network interface, for selecting a first protocol system to attempt to establish a data link connection via said channel between said apparatus and said remote system according to said first protocol, and for selecting and enabling said first protocol system if said data link connection via said channel is established and for selecting and establishing said second protocol system if said data link connection via said channel according to said first protocol cannot be established.

23. A network interfacing apparatus for interfacing at least one unit of terminal equipment to a switched network having at least one channel for transferring information including data to and from a remote system in accordance with one of a plurality of predefined protocols, said apparatus comprising:
a network interface adapted for transmitting and receiving units of information via said channel,
at least a first protocol system adapted for enabling said apparatus to communicate via said channel with said remote system according to a first protocol of said predefined protocols;
at least a second protocol system adapted for enabling said apparatus to communicate via said channel with said remote system according to a second protocol of said predefined protocols;
a system controller adapted for controlling said network interface, for selecting said first protocol system to attempt to establish a data link connection between said apparatus and said remote system according to said first protocol, for waiting for a predefined time period for said data link connection according to said first protocol to be established and for selecting and enabling said first protocol system means to enable said apparatus to communicate via said channel with said remote system if said data link connection is established; and
for selecting said second protocol system if said data link connection via said channel according to said first protocol cannot be established to attempt to establish a data link connection between said apparatus and said remote system according to said second protocol, for waiting for a predefined time period for said data link connection according to said second protocol to be established and for selecting and enabling said second protocol system to enable said apparatus to communicate via said channel with said remote system if said data link connection is established.

* * * * *